United States Patent [19]

Kamens et al.

[11] Patent Number: 5,418,434
[45] Date of Patent: May 23, 1995

[54] VOLTAGE-BOOSTING CIRCUIT FOR AN ELECTROLUMINESCENT LAMP DRIVER

[75] Inventors: Bruce H. Kamens, Thomaston; Harold Thorgersen, Woodbury, both of Conn.

[73] Assignee: Timex Corporation, Middlebury, Conn.

[21] Appl. No.: 292,307

[22] Filed: Aug. 18, 1994

[51] Int. Cl.6 .............................................. G09G 3/10
[52] U.S. Cl. ................... 315/169.3; 315/205; 315/226; 315/283; 315/DIG. 7
[58] Field of Search ...................... 315/169.3, 283, 246, 315/240, 158, 224, 205, 307, 226, DIG. 7; 363/41, 101

[56] References Cited

U.S. PATENT DOCUMENTS

| | | | |
|---|---|---|---|
| 4,011,557 | 3/1977 | Chetelat et al. | 340/336 |
| 4,208,869 | 6/1980 | Hanaoka | 368/84 |
| 4,210,848 | 7/1980 | Suzuki et al. | 315/169.3 |
| 4,238,793 | 12/1980 | Hochstrate | 340/781 |
| 4,253,097 | 2/1981 | Hochstrate | 340/781 |
| 4,449,075 | 5/1984 | D'Onofrio et al. | 315/169.3 |
| 4,527,096 | 7/1985 | Kindlmann | 315/169.3 |
| 5,332,950 | 7/1994 | Komoda et al. | 315/205 |

*Primary Examiner*—Robert J. Pascal
*Assistant Examiner*—Haissa Philogene
*Attorney, Agent, or Firm*—William C. Crutcher

[57] ABSTRACT

In a drive circuit for driving an electroluminescent device having an electroluminescent lamp, a battery, and a frequency divider circuit for generating a plurality of signals, including a first signal, the improved voltage-boosting circuit comprising first and second inductors electrically connected to the battery; a digital logic gate electrically connected to the frequency divider circuit; a first transitive switch electrically connected to the frequency divider circuit for receiving the first signal, and electrically connected to the first inductor for providing the first signal to the first inductor; and, a second transitive switch electrically connected to receive an output signal from the digital logic gate and electrically connected to the second inductor for providing the output signal to the second inductor, wherein the first and second inductors are caused to alternately provide high voltage pulses for driving the electroluminescent lamp. The digital logic gate may comprise a NOR gate having two terminals, one of which is electrically connected to receive a dimming signal for disabling the second inductor thereby reducing the electroluminescent lamp brightness. The operator of the electroluminescent lamp may selectively activate the digital logic gate to reduce lamp brightness.

17 Claims, 3 Drawing Sheets

VOLTAGE-BOOSTING CIRCUIT FOR AN ELECTROLUMINESCENT LAMP DRIVER

This invention relates to the driving of electroluminescent lamps. More specifically, this invention relates to an improvement in the voltage boosting circuit of a driving circuit which is used to drive electroluminescent lamp in timepieces.

Electroluminescent (EL) lamps which are used as backlights in timepieces are well known in the art. Such lamps may be schematically represented as a discrete capacitor connected in series with a discrete resistor, and therefore are characterized generally as "lossy" capacitors. It is also known that as EL lamps require A.C. excitation signals having voltage amplitudes of 40 to 80 volts, peak-to-peak, voltage boosting circuits are required in timepiece applications where the timepiece battery is often on the order of only 1.5 volts. Electronic circuits used to boost battery voltage and drive electroluminescent lamps are well known in the art. Some specific examples include, U.S. Pat. No. 4,011,557 (Chetelat et al.), which discloses an EL lamp which is energized via short impulses of high-intensity current arising from the alternate discharge of two capacitors. Other examples include, U.S. Pat. Nos. 4,238,793 (Hochstrate), U.S. Pat. No. 4,253,097 (Hochstrate), U.S. Pat. No. 4,449,075, (D'Onofrio et al.), and U.S. Pat. No. 4,527,096 (Kindlmann), all of which are assigned to the present assignee.

Figure 1:
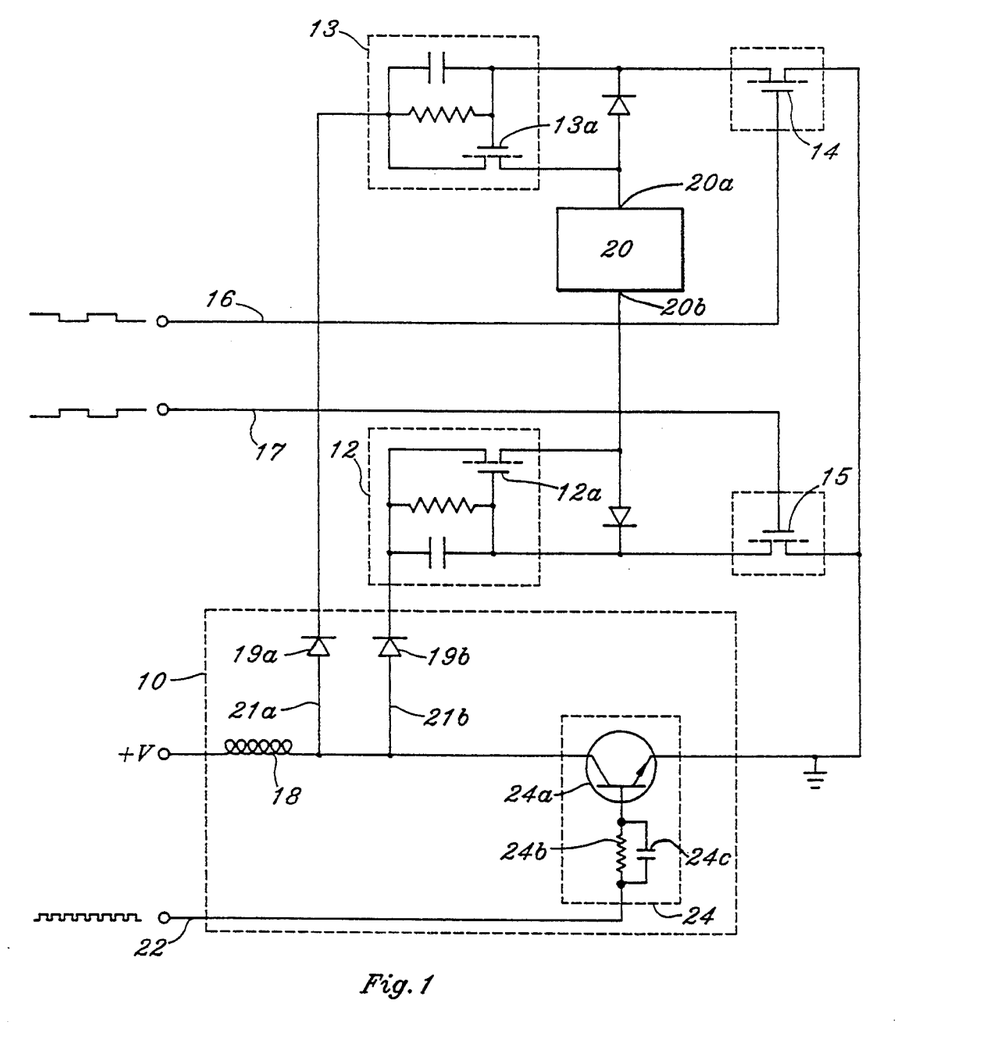
FIG. 1 shows a prior drive circuit for driving EL lamps, including a voltage-boosting circuit 10 and a current-mode bridge drive circuit.

U.S. Pat. No.4,527,096 (Kindlmann) (hereinafter, "Kindlmann" ), which is incorporated by reference herein, discloses a drive circuit for capacitive electroluminescent panels. FIG. 1 of the instant specification (FIG. 2 of Kindlmann), shows a specific embodiment of the Kindlmann invention. The drive circuit of Kindlmann may be thought of as comprising two portions: a voltage-boosting, or converter, circuit 10, and a current-mode bridge drive circuit substantially comprising transistor switching means 12, 13, 14, and 15, connected to an EL lamp 20 in an H-bridge configuration, which actually drives the EL lamp using the high voltage provided from converter 10.

The EL lamp, which has capacitive characteristics, serves to store the high voltage charge and is alternately charged and discharged to opposite polarities through the application of low frequency square wave gating signals having a 50% duty cycle over lines 16 and 17. At one lamp polarity, a positive pulse over line 17 causes FET 15 to conduct, pulling side 20b of the EL lamp to near ground. When a current pulse is delivered by the inductor 18 of the voltage-boosting, or converter, circuit 10 over line 21a, current flows through the drain of FET 13a to the EL lamp 20. Successive charging high voltage pulses from voltage boosting circuit 10 in this manner progressively charge the EL lamp 20 in order to provide for acceptable lamp brightness. At the opposite lamp polarity, after the EL lamp 20 is sufficiently charged, the signal over line 17 goes negative, and FET 15 stops conducting. After the signal over line 16 becomes positive, and between gating signals over line 22 (and thus before the next voltage pulse), FET 14 begins to conduct, and the EL lamp discharges through FET 12a and diode 19b to the inductor 18. (Some of the discharge current also flows through the base-collector junction of transistor 24a.) After the lamp is discharged, and because the signal over line 16 has become positive, FET 12a begins to conduct current via its drain when inductor 18 provides the next high voltage pulse. As a result, the EL lamp 20 is again incrementally charged; however, this time to the opposite polarity. Again, after the EL lamp 20 is sufficiently charged to the opposite polarity, it is discharged though FET 13a and diode 19a to inductor 18, when the low frequency signal over line 17 goes positive and FET 14 begins to conduct again. In view of the low power consumption and high step-up voltage ratio of the drive circuit of Kindlmann, it will be appreciated that the repeated operation of the drive circuit of Kindlmann provide an efficient method for energizing an EL lamp.

It will be understood that much of the efficiency of the drive circuit of Kindlmann is due to the power transfer efficiency and voltage step-up capability of the voltage-boosting circuit 10. The voltage-boosting circuit 10 substantially comprises an inductor 18, one terminal of which is electrically connected at a common point to diodes 19a and 19b, and to a transistor switch 24. The other terminal of inductor 18 is connected to the timepiece battery +V. The transistor 24a is preferably a n-p-n BJT, the collector of which is, again, connected to the inductor 18, the emitter of which is connected to ground, and the base of which is connected to a high frequency gating signal from line 22 through bias resistor 24b. (A small capacitor 24c is connected across resistor 24b to provide a current pulse to remove transistor base charge at switch turn-off, and further to increase base drive current during the turn-on transition. As a result the switching time of transistor switch 24 is greatly decreased). When a positive gate pulse is applied to the base of transistor switch 24, the transistor begins to conduct and current flows from the inductor 18 through the transistor 24a. A voltage appears across the inductor according to the relationship, $E = L^{di}/_{dt}$. When a relatively negative gate pulse is applied at the base of transistor 24a, the transistor turns off very quickly (due to the capacitor 24c ). In an attempt to keep constant current flowing through itself and the transistor, inductor 18 rapidly brings point X to a high voltage. Diode 19a (or, if the EL lamp is being charge the opposite polarity, 19b ) then conducts and as soon as sufficient voltage bias is provided, switch 13 (or 12) conducts to allow the voltage pulse from inductor 18 to charge the EL lamp 20. The voltage-boosting or converter portion 10 used in conjunction with a capacitive EL lamp can boost the average 1.5 volt timepiece battery to between approximately 50 to 100 volts (or 100 to 200 volts, peak-to-peak).

Although the voltage-boosting circuit 10 of Kindlmann provides an efficient means to charge an EL lamp, improvements have been sought to further increase its efficiency and versatility. First, in those cases where even the minimal peak current drain disclosed in Kindlmann is unacceptable, it may be desirable to drive an EL lamp of the dimensions and construction discussed above, to the same luminance as that shown in Kindlmann, but at a reduced peak current drain. Perhaps more importantly, while the converter of Kindlmann allows for sufficient EL lamp luminous intensity, it is desirable in many instances to increase the power output of said voltage-boosting circuit, and thereby increase the luminous intensity of an EL lamp of the dimensions and construction disclosed in Kindlmann. An example might be in the case where the EL lamp is used as a backlight in an analog timepiece, the dial of which comprises a dark color. Alternatively, it may be desirable to drive larger EL lamps to the same intensity as that referenced in Kindlmann; i.e., 0.4 foot-lamberts, as for example might be the case in those wristwatches having larger displays or dial faces.

However, as the efficiency of the Kindlmann driving circuit was in great part dictated by the fact that the voltage-boosting circuit 10 was operated at low battery current drain, and in part by certain operating characteristics of the inductor means 18 which comprise a portion of said voltage-boosting circuit 10, two points must be kept in mind. First, the increased intensity of the EL lamp preferably must not result in a sacrifice of greater current drain, which would not only reduce the life of the battery or other power source and increase battery voltage ripple, but would also necessitate an increase in the size of the switching elements of the voltage-boosting circuit or bridge drive circuit, all of which are undesirable. Second, it must be ensured that any inductor of said circuit is driven in such a manner that sufficient time is allowed for same to discharge so that its flux does not saturate on successive charging pulses, causing non-linear operation and thereby reducing the transfer efficiency of the voltage-boosting circuit.

In addition to increased power output, it is desirable to provide means to vary the EL lamp luminance. Further it is particularly desirable to provide means by which a user could selectively cause said EL lamp to operate at one of two luminous intensity levels.

Lastly, as it will be appreciated that as internal space within a timepiece is limited, it is desirable to reduce the total amount of space that circuit components of the EL lamp driver require.

It is therefore an object of the invention to provide an improved voltage-boosting circuit for use in driving an EL lamp.

It is another object of the invention to provide an improved voltage-boosting circuit for use in driving an EL lamp which serves as a backlight in timepiece displays.

Another object of the invention is to provide greater illumination of a given EL lamp.

A further object of the invention is to provide sufficient illumination of a larger EL lamp.

An additional object of the invention is to provide an improved voltage-boosting circuit which would permit increased luminance without an increase in peak current drain from the timepiece battery.

Another object of the invention is to provide an improved voltage-boosting circuit which is driven by a signal requiring less peak current drain from the battery.

Yet a further object of the invention is to provide an improved voltage-boosting circuit which provides a greater power output and thus greater illumination of EL lamps without increasing the current-switching requirements of the EL voltage-boosting circuit or bridge drive circuit.

An additional object of the invention is to provide for EL lamp illumination of variable luminous intensity.

A further object of the invention is to provide an improved voltage-boosting circuit which would allow the operator to selectively reduce the luminous intensity of the EL lamp output.

Yet another object of the invention is to provide an improved voltage-boosting circuit including an inductor, wherein the inductor component size and volume is reduced.

An additional object of the invention is to reduce battery voltage ripple during illumination of the EL lamp.

SUMMARY OF THE INVENTION

In a drive circuit for driving an electroluminescent device having an electroluminescent lamp, a battery, and signal generating means for generating a plurality of signals, including a first signal, the improved voltage-boosting circuit comprising first and second inductor means electrically connected to the battery; logic means electrically connected to the signal generating means; first switching means electrically connected to the signal generating means for receiving the first signal, and electrically connected to the first inductor means for providing the first signal to the first inductor means; and, second switching means electrically connected to receive an output signal from the logic means and electrically connected to the second inductor means for providing the output signal to the second inductor means, wherein the first and second inductor means are caused to alternately provide high voltage pulses for driving the electroluminescent lamp.

The logic means may comprise a NOR gate having two terminals one of which is electrically connected to receive a dimming signal for disabling the second inductor means and thereby reducing the electroluminescent lamp brightness. Preferably the user of the electroluminescent lamp may selectively activate the logic means to reduce lamp brightness.

DESCRIPTION OF THE PREFERRED EMBODIMENT

Referring to FIG. 1, it is known from Kindlmann that the driver circuit shown therein can be used to drive a known EL lamp to produce an optimal light output on the order of 0.4 foot-lamberts. It was also disclosed that EL lamps of varying dimensions might be constructed, which might thus require varying the number of successive current charging pulses in order to produce said optimal light output.

As stated in the objects of the invention, however, it is desired to provide a voltage-boosting circuit which provides greater output power, and thus greater intensity, for an EL lamp of the dimension and construction shown in Kindlmann; or alternatively, which is capable of driving larger lamps to the same luminance as shown therein; i.e., approximately 0.4 ft-lambert. Again, it is also desired that this increase in output luminance not be at the sacrifice of increased peak current drain, that such voltage-boosting circuit is operated so that the inductive fluxes do not saturate on successive charging pulses, and that such increase in output power should not necessitate an increase in the switching requirements of any of the switching components of the EL voltage-boosting circuit or the bridge drive circuit, such as the current-mode bridge circuit shown in Kindlmann at FIG. 3.

I. Circuit

Figure 2:
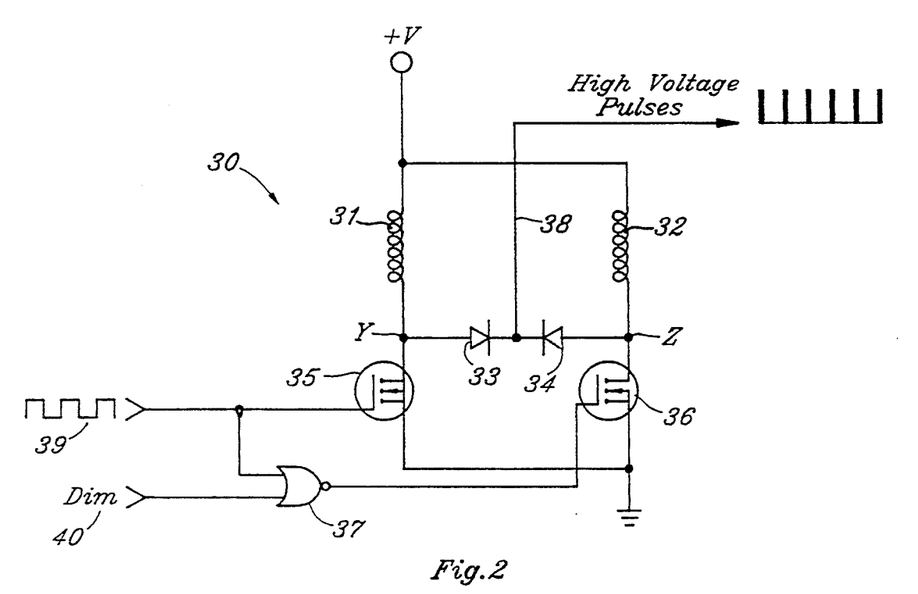
FIG. 2 shows the improved voltage-boosting circuit of the invention.

FIG. 2 shows a preferred embodiment of the voltage-boosting circuit 30 of the instant invention. The voltage-boosting circuit 30 comprises two two-terminal inductors 31, 32, semiconductor diodes 33, 34, transistor switches 35, 36, and logic gate 37. The line 38 may be directly connected to an EL lamp driver bridge (not shown) as known in the art, such as the H-bridge circuit shown in Kindlmann (FIG. 3) which will be discussed, infra.

In the preferred embodiment shown in FIG. 2, one terminal each of inductors 31, and 32 is electrically connected to the timepiece battery, +V. The second terminal each of inductors 31, 32 is electrically connected respectively to the anodes of diodes 33, 34, and to three-terminal transistor switches 35, 36. The input terminal of switch 35 is electrically connected to receive an input signal 39 which is provided by at least one of the different stages of the timepiece frequency divider circuit (not shown). Each of the switches 35, 36 is also preferably grounded via their respective third terminals.

The input terminals of switches 35, 36 are electrically connected to digital logic gate 37. In the preferred embodiment the digital gate 37 comprises a NOR gate, the inputs of the which comprise an input signal 39 and a dimming signal 40 (not shown), the latter of which may be activated for dimming the intensity of the EL lamp (and the operation of which will be further discussed infra, at C.) However, if it is not desired that the voltage-boosting circuit have EL lamp dimming capability, logic gate 37 may instead comprise a simple inverter device.

It may be seen from the preferred embodiment of FIG. 2, that transistor switches 35 and 36 are n-channel MOSFET's; however similar devices, such as BJT's may be used instead. In this embodiment, the second terminals of inductors 31, 32 are electrically connected to the drains of switches 35 and 36, respectively, while the sources of said switches are electrically connected to grounded. Additionally, the gate of switch 35 is electrically connected to receive the input signal 39, while the gate of switch 36 is electrically connected to receive the output signal from logic gate 37.

II. Operation

Operation of the voltage-boosting circuit 30 of the present invention may be best understood with reference to FIG. 2. When the input signal 39 introduced at the gate of switch 35 goes positive (logic high), sufficient biasing voltage occurs to cause switch 35 to turn on. Switch 35 is now effectively pulled to near ground since its source is electrically connected to ground, and the voltage drop across the switch 35 is small in relation to the voltage introduced at the drain. As switch 35 is on, current begins to flow through inductor 31 to ground, through the switch 35. When the input signal 39 goes negative (logic low), the switch 35 turns off, and drain current through switch 35 also stops. The current through the inductor 31 cannot immediately drop off, however, as this would imply an infinite voltage across same (according to the relationship, $E = L \, di/dt$). Thus in an effort to maintain current through itself, inductor 31 pulls point Y to a large positive voltage. (As previously mentioned, the inductor-transistor combination can greatly step up the voltage to between approximately 50 to 100 volts.)

When sufficient voltage at point Y is reached, the diode 33 becomes forward biased, and a high voltage pulse will appear across line 38 to charge the EL lamp. When the input signal goes positive again, the transistor switch 35 will turn on and current will again flow through the switch 35 to ground. Again, since the switch 35 is effectively pulled to near ground under these conditions, diode 33 will be reverse-biased and no current will flow through same. It will thus be appreciated that the operation of switch 35 in this manner will produce high voltage pulses over line 38, which may be applied to an EL lamp to progressively charge same.

With respect to the operation of switch 36, as previously stated, in the preferred embodiment a digital logic NOR gate 37 is electrically connected intermediate the input signal 39 and the gate of switch 36. When it is desired that full output power be delivered to the EL lamp, dimming signal 40 is held at logic low. When the input signal 39 goes to logic high, switch 35 is conducting and inductor 31 is charging to a voltage, $E_i$, the switch 36 is turned off since the NOR gate output is at logic low (1+0=0). When the input signal goes to logic low, switch 35 is non-conducting, inductor 31 is providing voltage pulses, and switch 36 is now turned on, since the output from NOR gate 37 is now at logic high (0+0=1). Therefore a voltage proportional to $di/dt$ begins to appear across inductor 32. When the input signal 39 goes high again, transistor switch 36 turns off, current through transistor switch 36 stops, and inductor 32 attempts to keep current flowing though itself by bringing point Z to a large positive voltage. As with the operation of switch 35 and inductor 31, when sufficient voltage at point Z is reached, the diode 34 becomes forward biased, and a high voltage pulse will appear over line 38, which may be applied to an EL lamp to progressively charge same.

It will be thus understood that when switch 36 is off and inductor 32 is providing high voltage pulses for charging the EL lamp, switch 35 is on, and inductor 31 is charging. Conversely, when switch 35 is off and inductor 31 is providing current pulses for charging the EL lamp, switch 36 is on, and inductor 32 is charging. In this manner, each inductor alternately provides the power required to energize the EL lamp.

Figure 3:
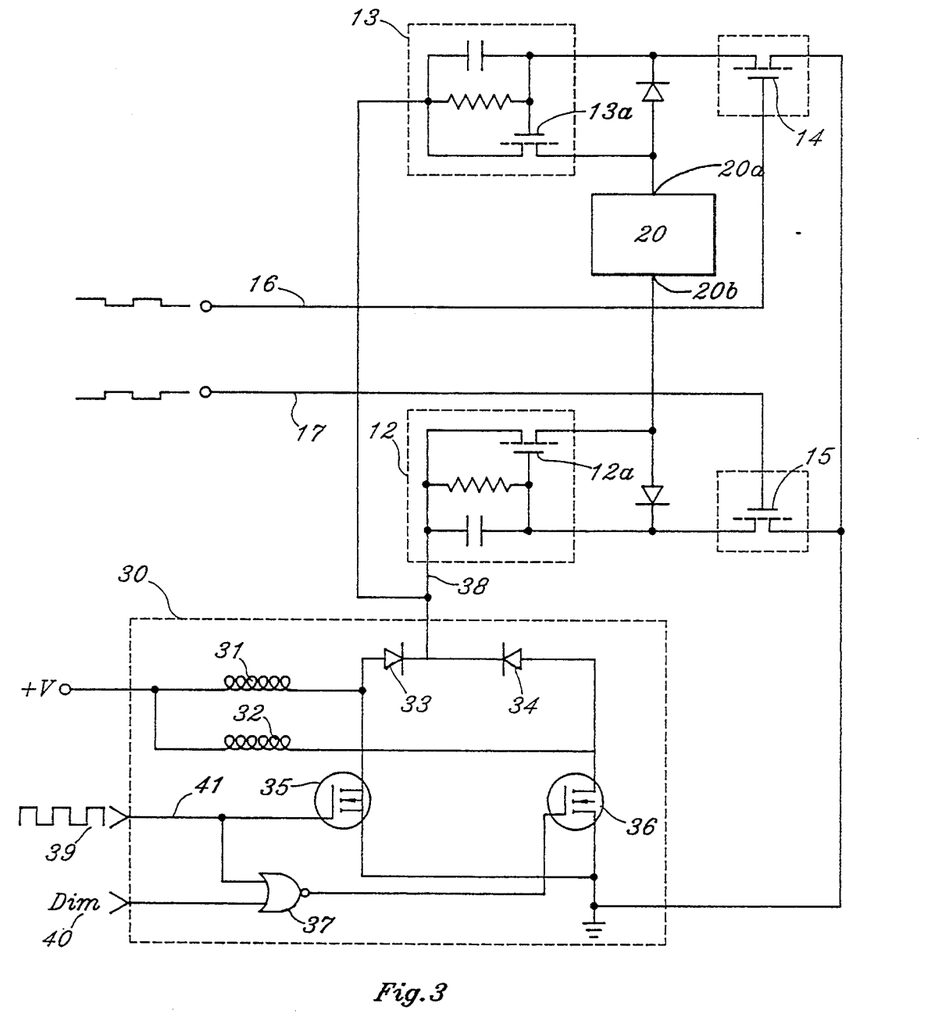
FIG. 3 shows the improved voltage-boosting circuit of FIG. 2 as used in the EL lamp driver circuit of FIG. 1.

Referring to FIG. 3, the voltage-boosting circuit 30 of the present invention is preferably electrically connected to the current-mode bridge drive circuit disclosed in Kindlmann. As discussed, supra, at one lamp polarity, a positive pulse over line 17 causes FET 15 to conduct, pulling side 20b of the EL lamp 20 to near ground. When a voltage pulse is delivered by the inductors 31, and 32, alternately over line 38, current flows through the drain of FET 13a to the EL lamp 20. Successive charging high voltage pulses from voltage boosting circuit 30 in this manner progressively charge the EL lamp 20 in order to provide for acceptable lamp brightness. At the opposite lamp polarity, after the EL lamp 20 is sufficiently charged, the signal over line 17 goes negative, and FET 15 stops conducting. After the signal over line 16 becomes positive, and between gating signals over line 41 (and thus before the next voltage pulse), FET 14 begins to conduct, and the EL lamp discharges through FET 12a and diodes 33 and 34 to the inductors 31 and 32. (Some of the discharge current also flows through the gate-drain junction of transistors 35, 36.) After the lamp is discharged, and because the signal over line 16 has become positive, FET 12a begins to conduct current via its drain when inductors 31 and 32 alternately provide the next high voltage pulse. As a result, the EL lamp 20 is again incrementally charged;

however, this time to the opposite polarity. Again, after the EL lamp 20 is sufficiently charged to the opposite polarity, it is again discharged though FET 13a and diodes 33 and 34 to inductors 31 and 32, when the signal over line 17 goes positive and FET 14 begins to conduct again.

A. Reduced Current Drain in a Known EL Lamp

As stated previously, the voltage-boosting circuit 10 of Kindlmann provided optimal luminous intensity at minimal current drain. However, in some instances it is desirable to reduce this minimal drain even further. As was seen in Kindlmann, the input signal over line 22 to inductor 18 of voltage-boosting circuit, or converter, 10, preferably has a duty cycle of 75% in order that the EL lamp is energized to provide a high light output on the order of 0.4 ft-lamberts from a single-cell battery at low current drain. In the voltage-boosting circuit 30 of the present invention, it is found that since two inductors 31 and 32 are alternately charged and then discharged to provide the charge for the EL lamp 20, an input signal having a 1:1 on-off ratio, or 50% duty cycle, which is provided to the voltage boosting circuit 30, can be used to drive and EL lamp of the dimensions and construction disclosed in Kindlmann to the same luminance, but at 25% less peak current drain. Thus the peak current drain of the voltage-boosting circuit of the present invention is (75%–50%) or 25% less than that of the converter 10 of Kindlmann.

Furthermore, this reduction in peak current drain is accomplished with only a slight reduction in the inductance of inductor 18 of the Kindlmann voltage-boosting circuit 10, which is important since, as seen from the relationship LI=Vt, for a constant flyback voltage, the turnoff time of the inductor-driving switches 35 and 36 must decrease proportionately to a decrease in inductance, and a severe reduction of inductance would necessitate increased switching capabilities of the transistor switches of the EL bridge driver circuit (e.g., the current mode H-bridge circuit of FIG. 3) which is undesirable. The reduction in inductance for each inductor 31 and 32 may be calculated as follows:

Since each inductor in the voltage-boosting circuit of the present invention provides equal power to the EL lamp, each inductor need only provide ½ of the energy, as known from the relationship, $W=\int P$. Therefore, since $$P_1=P_K, \text{ when } I_{p1}=0.75 i_{pK}, W_1/\text{inductor}=\tfrac{1}{2}(W_K)$$

where
  $I_{p1}$=peak current drain of voltage-boosting circuit of and invention
  $I_{pK}$=peak current drain of voltage-boosting circuit of Kindlmann.
and $$\tfrac{1}{2}(L_1 I_1^2)=(\tfrac{1}{2})(\tfrac{1}{2} L_K I_K^2)$$

where
  $L_K$=inductance of Kindlmann voltage-boosting inductor 18, and
  $L_1$=inductance of each of inductors 31, 32 of voltage-boosting circuit of present invention.
Through substitution, it is seen that $$(2)(0.5625\ L_1 I_{pK}^2) \approx L_K(I_{pK}^2),$$

and therefore, $$L_K \approx 1.12 L_1, \text{ or } L_1 \approx 0.893\ L_K.$$

Therefore the value of each of inductors 31 and 32 is approximately 11% less than that of inductor 18 of Kindlmann. Thus it is seen that one advantage of the present invention is that, in those cases where peak current drain is a concern, an EL lamp of the dimensions and construction shown in Kindlmann can be driven to the same brightness at 25% less peak current drain, with only a slight reduction in the inductance value of each inductor 31 and 32. It will be further appreciated that and added benefit of the reduction in current drain is that the effective capacity of the battery may be increased and battery ripple reduced.

B. Increased Luminance of a Known EL Lamp

Most often, however, the peak current drain disclosed in Kindlmann is sufficiently small so that peak current drain is not a concern. In those cases where peak current drain is not a concern, it is desirable to increase the output power of the voltage-boosting circuit without increasing the minimal current drain disclosed in Kindlmann. It is found that if an input signal having the same duty cycle as discussed above, i.e, 50%, is provided to the voltage-boosting circuit 30 of the present invention, an EL lamp of the size and construction shown in Kindlmann can be driven to 33% greater illumination; alternatively, such signal is capable of driving a larger lamp on the order of 1.33 to the same illumination shown in Kindlmann (i.e., 0.4 foot-lamberts). Importantly, in neither case is peak current drain increased beyond that shown in Kindlmann, and in fact in each case, the voltage-boosting circuit may be driven at the same minimal current drain. The preceding statements may be best understood with reference to the following analysis:

When $$I_{pK}=I_{p2},$$

where
  $I_{pK}$=peak current in voltage-boosting circuit 10 of Kindlmann, and $I_{p2}$=second peak current drain in voltage-boosting circuit 30 of the present invention; then $$P_2=V_i I_{p2}=V_i I_{pK},$$

where
  $V_i$=voltage over either inductor 31 or 32, and $P_2$=power delivered by circuit of present invention driven by $I_{p2}$.

From the previous discussion, it was found that the power delivered by the voltage-boosting circuit of the present invention and that of Kindlmann are equal when the peak current drain of the present invention ($I_{p1}$) is 25% less than that of the peak current drain of Kindlmann ($I_{pK}$), or when $I_{p1}=0.75 I_{pK}$. Therefore, since $$P_1=P_K \text{ when } I_{p1}=0.75 I_{pK},\ P_1=0.75 V_i I_{pK}$$

where
  $V_i$=voltage over either inductor 31 or 32, and
  $P_1$=power delivered by voltage-boosting circuit of present invention when driven by $I_{p1}$, or $0.75 I_{pK}$;
  $P_K$=power delivered by voltage-boosting circuit of Kindlmann and $$P_2 = V_i I_{pK}, \text{ when } I_{p2} = I_{p1}$$

where
$P_2$ = power delivered by circuit of present invention when driven by $I_{p2}$, $I_{pK}$;

$$P_2/P_1 = P_2/P_K = V_i I_{pK}/0.75 V_i I_{pK} = 4/3.$$

Thus, the power output of the voltage-boosting circuit of the present invention is 33% greater than that of the circuit of Kindlmann, when driven under the same current drain, and therefore the luminance of the EL lamp is approximately 33% greater than that of Kindlmann. (Furthermore, it will be appreciated that since power increases by 33%, lamp size may be increased by 33% in order to provide the same luminance as that of El lamp of Kindlmann i.e., 0.4 ft-lambert ).

As indicated above, this increase in power output can be achieved with a 33% decrease in inductance of each inductor. Again, since each inductor provides power to the EL lamp, need only supply one-half the energy of that of Kindlmann. Since the power output when $i_{p2} = i_{pK}$ is 33% greater; $W_2 = 4/3 \, W_K$. Therefore, $$W_2/\text{inductor} = \tfrac{2}{3} W_K, \text{ and } \tfrac{1}{2}(L_2 I_{p2}^2) = (\tfrac{2}{3})(\tfrac{1}{2}(L_K I_{pK}^2)).$$

Since $I_{p2} = I_{pK}$, $$\tfrac{1}{2}(L_2 I_{pK}^2) = \tfrac{2}{3}(L_K I_{pK}^2), \text{ and } L_2 = \tfrac{2}{3} L_K.$$

Thus not only are the output of the voltage-boosting circuit 30 and the luminance of the EL lamp increased, but the value of each of the inductors 31 and 32 is reduced by 33% over that of the inductor 18 of the voltage-boosting circuit of Kindlmann. This is advantageous since given the limited internal space within a timepiece, two small inductors often use space more economically than one larger inductor. Importantly, however, this reduction in inductance is not such a severe decrease in inductance to necessitate an increase in the switching capabilities of the current-mode H-bridge circuit of FIG. 3, as discussed, supra.

Therefore the main advantage of the voltage-boosting circuit of the present invention is that it provides a 33% increase in power output over that of the voltage-boosting circuit shown in Kindlmann, with no increase in the minimal peak current drain disclosed therein, which, again, is important to power transfer efficiency and thus overall EL lamp driver efficiency. Furthermore, the 33% reduction in inductance per inductor, allows for more efficient use internal timepiece space without necessitating an increase in the switching capabilities of the current-mode H-bridge circuit of FIG. 3.

It should be noted that, as stated previously, another concern in the driving of the voltage-boosting circuit of the present invention is that the inductors of said circuit be driven so that their respective fluxes are not saturated, so as to decrease the efficiency of the power transfer of said circuit. Again, it is known from the relationship, $LI = Vt$, that the time required to discharge the energy stored in an inductor is inversely proportional to the induced voltage. Thus the smaller the induced voltage, the longer the discharge time. It is therefore important that sufficient time be allowed for the dissipation of energy in inductors 31 and 32 before they are recharged at the next activating input pulse. Discharge time must be great enough to allow inductors 31 and 32 to discharge when the induced voltage is at its lowest, which in the case of the EL driver circuit of FIG. 3 it, occurs at the start of each half-cycle of the current-mode H-bridge drive circuit output. It is found that an input signal having a 50% duty cycle was capable of driving the voltage-boosting circuit 30 of the present invention without causing the fluxes of inductors 31 and 32 to saturate.

C. Dimmer

In the preferred embodiment of the present invention, the voltage-boosting circuit 30 further comprises means to decrease or dim the luminance of the EL lamp, and preferably to allow the EL lamp operator to cause said EL lamp to operate between a high and low luminance level. The operation of such feature may be best understood with reference to FIG. 2.

As stated previously, while one input to the digital NOR gate comprises the DC pulse signal 39, the other comprises a dimming signal 40 which is ordinarily held at logic low in order to produce more luminance of a given EL lamp. However, if instead the dimming signal is raised to logic high, it will be understood that switch 36 will never conduct, irrespective of the value of the input signal to switch 35 since the output of the NOR gate will always be logic low ($0+1=0$ and $1+0=0$). As a result, only switch 35 will ever conduct, and thus only inductor 31 will provide voltage pulses to the EL lamp 20. As only inductor 31 provides voltage pulses to the EL lamp 20, one-half the energy is received by the EL lamp 20 and thus luminance intensity is decreased. Thus it will be appreciated that the output luminance may be alternated between two output levels: A high output luminance level, where both inductors are activatable; and a low output luminance level, where one of the inductors is disabled.

It is also within the scope of the invention to include the voltage-boosting circuit in an EL backlighted timepiece, upon the case of which may be disposed a manual actuator or crown which the operator can operate to activate the dimming signal. In digital electronic timepieces, the timepiece case includes manual pushbutton actuators arranged to close spring contacts inside the watch case, as known in the art. Such electronic timepieces generally include a programmable microcomputer in the form of a mask-programmable integrated circuit which is bonded to a printed circuit board and which, through suitable pin connections and leads, is connected to various external components, including the actuators. Well known programming techniques are used to determine whether the switches are open or closed and for taking appropriate action through the operating system computer program stored in the microcomputer memory, in which each switch condition is tested during each completed interrogation cycle in a loop. If any switch is closed, the program branches to a subroutine which initiates a counter. The counter determines how long the switch has been closed, and acts appropriately thereafter. The dimming means may be similarly connected so that the operator may actuate a pushbutton to control the dimming of the EL lamp. Alternatively, in those timepieces having an analog movement, manual crown actuators may be manipulated, as known in the art, to control various time and alarm setting functions. In a similar manner, a manual actuator may be connected to the dimming means of the present invention to allow the operator to control the luminance of the EL lamp.

It can be seen from the foregoing that the voltage-boosting circuit of the present invention provides an efficient and versatile means by which to increase luminance of a given EL lamp or to drive larger EL lamps to the same luminance without increasing peak current drain or sacrificing power transfer efficiency. Alternatively, in those instances where peak current drain is crucial, the voltage-boosting circuit of the present invention provides an efficient way to further reduce said current drain. Finally, the voltage-boosting circuit of the present invention provides a simple means by which a timepiece operator can dim the intensity of the EL lamp by simple disablement of one inductor.

While there has been described what is considered to be the preferred embodiment of the invention, other modifications will occur to those skilled in the art, and it is desired to secure in the appended claims all such modifications as fall within the true scope and spirit of the invention.

I claim:

1. In a drive circuit for driving an electroluminescent device having an electroluminescent lamp, a battery, and signal generating means for generating a plurality of signals, including a first signal, an improved voltage-boosting circuit comprising:
   first and second inductor means electrically connected to said battery;
   logic means electrically connected to said signal generating means;
   first switching means electrically connected to said signal generating means for receiving said first signal, and electrically connected to said first inductor means for providing said first signal to said first inductor means; and,
   second switching means electrically connected to receive an output signal from said logic means and electrically connected to said second inductor means for providing said output signal to said second inductor means, wherein said first and second inductor means are caused to alternately provide high voltage pulses for driving said electroluminescent lamp.

2. In a drive circuit for driving an electroluminescent device having an electroluminescent lamp, a battery, signal generating means for generating a plurality of signals, including a first signal, and converter means electrically connected to said electroluminescent lamp, an improved voltage-boosting circuit comprising:
   first and second inductor means electrically connected to said battery;
   logic means electrically connected to said signal generating means;
   first switching means electrically connected to said signal generating means for receiving said first signal, and electrically connected to said first inductor means for providing said first signal to said first inductor means; and,
   second switching means electrically connected to receive an output signal from said logic means and electrically connected to said second inductor means for providing said output signal to said second inductor means, wherein said first and second inductor means are caused to alternately provide high voltage pulses for driving said electroluminescent lamp,
   wherein said converter means are further electrically connected to said first and second switching means, said converter means converting said high voltage pulses from said voltage-boosting circuit into a predetermined number of current pulses to said electroluminescent lamp in order to incrementally charge said electroluminescent lamp to alternating polarities whereby said electroluminescent lamp is caused to emit light.

3. The voltage-boosting circuit of claim 1, wherein said first signal has a duty cycle to drive said first and second inductor means so that their respective fluxes do not saturate.

4. The voltage-boosting circuit of claim 1, wherein said first signal comprises D.C. pulses, said first signal further having a duty cycle so that said first and second inductor means are allowed to discharge between the provision of said consecutive D.C. pulses by said first and second switching means, respectively.

5. The voltage-boosting circuit of claim 4, wherein the duty cycle of said first signal is 50%.

6. The voltage-boosting circuit of claim 1, wherein said first and second switching means comprise FET transistors.

7. The voltage-boosting circuit of claim 6, wherein said switching means further comprise diodes electrically connected to said FET transistors.

8. The voltage-boosting circuit of claim 1, wherein said logic means comprise a NOR gate electrically connected between said signal generating means and said switching means.

9. The voltage-boosting circuit of claim 8, wherein the NOR gate has two input terminals, a first of which is electrically connected to receive said first signal from said signal generating means, and the second terminal of which is electrically connected to receive a dimming signal.

10. The voltage-boosting circuit of claim 1, wherein said first and second inductor means comprise two inductors electrically connected in parallel.

11. The voltage-boosting circuit of claim 1, wherein said first and second inductor means are driven in order that each provides one-half the total energy used to light said electroluminescent lamp.

12. The voltage-boosting circuit of claim 1, wherein said inductor means are driven at a 180° phase difference.

13. In a drive circuit for driving an electroluminescent device lamp having an electroluminescent lamp, a battery, and signal generating means for generating a plurality of signals, including a first signal, the improved voltage-boosting circuit comprising:
   first and second inductor means electrically connected to said battery;
   switching means electrically connected to said signal generating means for receiving said first signal and to said first and second inductor means for providing said first signal to said first and second inductor means in order to provide a preselected number of high voltage pulses for causing said electroluminescent lamp to charge to a first luminance;
   dimming means electrically connected to said switching means for selectively causing said second inductor means to be disabled, whereby said electroluminescent lamp is caused to charge to a second luminance which is less than that of said first brightness.

14. The voltage-boosting circuit of claim 13, wherein only said first inductor means provides power to the electroluminescent lamp, whereby the luminance of said electroluminescent lamp is reduced.

15. The voltage-boosting circuit of claim 13, wherein said dimming means are further electrically connectable to receive a dimming signal to cause said second inductor means to be disabled in response to said dimming signal.

16. The voltage-boosting circuit of claim 15, wherein said second inductor means are disabled when said dimming signal has a value of logic high.

17. The voltage-boosting circuit of claim 13, wherein said voltage-boosting circuit is disposed in a timepiece having a display, a case, at least one manual actuator disposed on said case, a timekeeping circuit electrically connected to said battery, said timekeeping circuit providing time information to said display, wherein said at least one manual actuator may be selectively actuated by a timepiece operator to activate said dimming signal, whereby said electroluminescent lamp brightness is dimmed.

* * * * *